Dec. 22, 1953
H. L. DAVIES
2,663,604
REFRIGERATING APPARATUS
Filed June 1, 1950
2 Sheets-Sheet 1
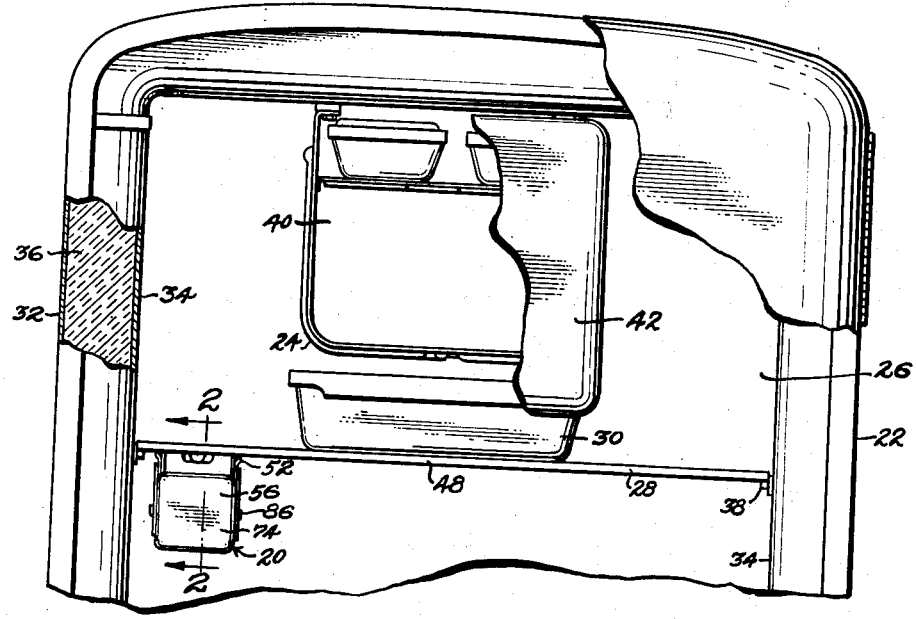
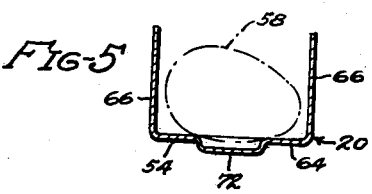
INVENTOR.
HERBERT L. DAVIES
BY
Ralph E. Baker
ATTORNEY

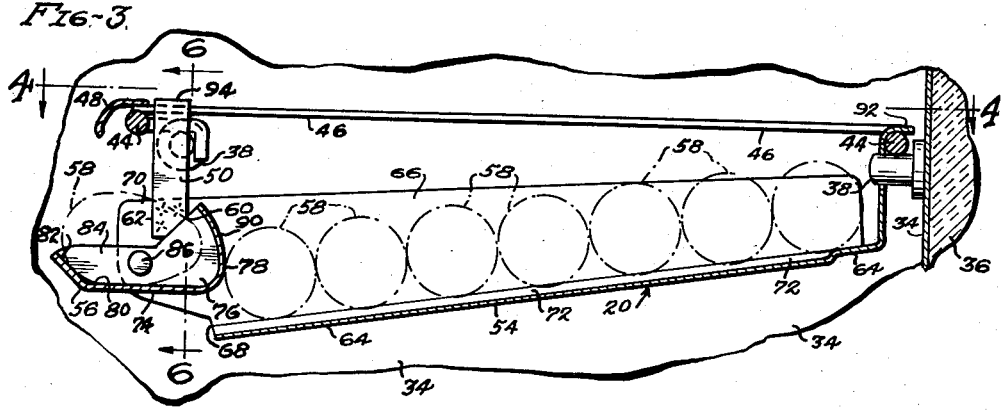

Patented Dec. 22, 1953

2,663,604

UNITED STATES PATENT OFFICE 2,663,604

REFRIGERATING APPARATUS

Herbert L. Davies, Detroit, Mich., assignor to Nash-Kelvinator Corporation, Detroit, Mich., a corporation of Maryland Application June 1, 1950, Serial No. 165,538

2 Claims. (Cl. 312—49)

This invention relates generally to refrigerating apparatus and more particularly to egg dispensers for use in such apparatus.

One of the objects of the present invention is to provide for a refrigerator, an improved egg dispenser for storing and dispensing eggs conveniently.

Another object of the invention is to provide an improved egg dispensing device of a character such that operation of a dispenser member thereof to remove an egg from an egg runway of the device simultaneously also functions to prevent movement of eggs down the runway during the dispensing action.

Another object of the invention is to provide an egg dispenser of the above mentioned character which is suspended by hangers in a refrigerator in a manner such that the hangers also function as stops for a moveable egg dispenser so as to decrease cost of such devices.

Further objects and advantages of the present invention will be apparent from the following description, reference being had to the accompanying drawings, wherein a preferred form of the present invention is clearly shown.

In the drawings:

Fig. 1 is a fragmentary front view of a refrigerator, containing my improved egg dispenser;

Fig. 2 is a vertical sectional view of my egg dispenser, taken along the line 2—2 of Fig. 1;

Fig. 3 is a view similar to Fig. 2 illustrating the dispensing of an egg from the device;

Fig. 4 is a horizontal sectional view of the refrigerator and egg dispenser, taken along the line 4—4 of Fig. 3;

Fig. 5 is a detailed sectional view of the egg dispenser, taken along the line 5—5 of Fig. 2; and Fig. 6 is a detailed vertical sectional view of the egg dispenser, taken along the line 6—6 of Fig. 3.

Referring to the drawings by characters of reference, my egg dispensing device, designated generally by the numeral 20, is adapted for storing eggs in a refrigerator cabinet 22, wherein the eggs and other food may be refrigerated by a suitable cooling element or refrigerant evaporator 24. In the present arrangement, the evaporator 24 is suspended from the cabinet top wall within a food storage compartment 26, above a shelf 28, and the egg dispensing device 20 is suspended from the shelf adjacent one side wall of the compartment. A drip pan 30, which also may be supported by the shelf 28, is located below the evaporator 28.

The cabinet 22 may comprise generally, a sheet material casing 32 and a sheet material liner 34. Between the casing 32 and liner 34 any suitable heat insulating material 36 may be provided to decrease heat leakage into the food storage compartment 26. Secured in and to the sides of the liner 34 are suitable supports 38 for the shelf 28.

Any suitable type of refrigerant evaporator may be used in the cabinet such as the type shown which has a storage chamber 40 for ice cubes, frozen foods, etc. An access opening in the front of the storage chamber is preferably closed by a door 42.

The shelf 28 is of the grid type to allow for circulation and, therefore, cooling of air by the evaporator 24 throughout the food storage compartment. Preferably, the shelf 28 is constructed of wire having an outer frame 44 and spaced wires 46 secured at their opposite ends to the frame. Welded, or otherwise secured to the shelf 28, is a scuff or bumper plate 48 which extends along the front edge of the shelf and preferably has a downturned flange shielding the front bar of the shelf frame 44.

Referring now to my egg dispensing device 20, this device comprises in general, supporting members or hangers 50, 52, an egg storage chute or inclined runway 54, and an egg dispenser member or lever 56. The hangers 50, 52 support the runway 54 within the food storage compartment 26 such that the runway is inclined to feed eggs, designated by the numeral 58, downwardly and forwardly by gravity toward the front of the cabinet for ready access. The dispenser member 56 is pivoted on the runway 54 adjacent the lower end thereof and is manually operable to lift the lowermost egg from the runway from its egg receiving position, shown in Fig. 2, to its egg delivery position, shown in Fig. 3. Rotative movement of the dispenser member 56 to the abovementioned positions is limited in opposite directions respectively by stop members 60, 62, provided by the hangers 50 which are arranged to function as the stops for the dispenser so as to decrease cost of the device.

The runway 54 may be made of sheet metal in the form of a channel having a bottom wall or web 64 and upstanding oppositely disposed side walls or flanges 66. At its lower end the runway bottom wall 64 is cut away, as at 68, to provide a discharge opening therefrom and also to provide extended ears 70 to which to pivot the dispenser member 56 at the discharge end of the runway. In the runway bottom wall 64, a depression 72 is provided which extends longitudinally thereof substantially midway of the runway sides 66 to form a track for guiding the eggs, as well as to rigidify the sheet metal runway.

The dispenser member 56 includes a plate type lever 74 which is fulcrumed intermediate its end to pivot horizontally in the dispensing of eggs. On one side of the fulcrum, the plate or lever 74 carries an egg receiver cup 76 and a gate 78, and on the other side of the fulcrum there is an egg support 80 which is also a lever arm of the dispenser member. The egg receiver cup 76 is arranged to receive the lowermost egg at the discharge end of the runway, as shown in Fig. 2, from which position the cup may be rotated to the position shown in Fig. 3 to deliver the egg for ready access from the front of the device on the support 80. When the dispenser is rotated to remove an egg from the runway, the gate 78 moves therewith to engage the next egg and prevent movement of the eggs down the runway during the dispensing operation. The lever arm 80 is adapted to engage the stop 60 to limit rotative movement of the dispenser member in one direction or to limit movement of the dispenser to its egg receiving position, and the arm 80 also functions to support the egg being dispensed, as shown for example in Fig. 3. The stop member 60 stops the dispenser when the lever arms thereof are substantially horizontal, at which time the egg, due to its unbalanced weight swings about with its heavy end disposed forwardly on lever arm 80. The cup 76 is balanced such that the weight of the average egg will overcome the weight of the cup and maintain the dispenser in the egg delivery position shown in Fig. 3 so that only one hand is needed to operate the dispenser and remove an egg therefrom.

Preferably, the dispenser member 54 is provided with a retaining flange 82 extending along the outer end of lever arm 80 which may be inclined outwardly to the plate to facilitate removal of the egg. This flange 82 is integral with oppositely disposed side flanges 84 wherein pivot pins 86 may be provided to pivot the egg dispenser to the ears 70 of the runway sides. To form the cup 76 and gate 78, the width of the retaining flanges 84 is increased, as at 88, and are joined together by a bottom flange 90. As shown, the bottom of the cup may be contoured, the curvature of which may be generated about the center of rotation of the cup. Thus, the gate 78 presents a convex surface to the lowermost egg in the runway to reduce friction therewith when the cup is moved upwardly to dispense the egg therein. In the present construction, because of the added weight of the cup 76 on the otherwise substantially balanced dispenser lever, the dispenser 56 will normally hang in the position shown in Fig. 2 with the cup down, containing the egg previously moved down from the end of the runway 54.

At the rear end of the runway, the hangers 52 may be formed by turning up surplus sheet material of the runway bottom wall and forming the upper ends with hooks 92 to engage over the shelf rear frame member. At the front of the runway 54, the hangers 50 may be welded to the inside surfaces of the ears 70 and have upper hooked ends 94 to engage over wires of the shelf. Thus, it will be seen that the dispensing device may be readily detached from the shelf for removal from the refrigerator when it is desired to store eggs in the device.

From the foregoing description it will now be understood that I have provided an improved device for storing eggs in a refrigerator and for conveniently dispensing the eggs. It will also be understood that I have provided an egg dispensing device in which a moveable dispenser both removes an egg from the device and controls feeding of the eggs down the device runway in the interests of decreasing cost of such devices. In addition it will be understood that I have provided an improved low cost egg dispenser by arranging the elements thereof, including hangers, to serve dual purposes.

Although only a preferred form of the invention has been illustrated, and that form described in detail, it will be apparent to those skilled in the art that various modifications may be made therein without departing from the spirit of the invention or from the scope of the appended claims.

I claim:

1. An egg dispenser for use in storing and dispensing eggs within a refrigerator comprising, an inclined runway receiving and feeding eggs downwardly by gravity, said runway having a discharge end, upstanding oppositely disposed sides extending along said runway and extending beyond the discharge end thereof to form a pair of ears, a cup member between and pivoted to said ears to swing about a horizontal axis, said cup member being arranged at said discharge end of said runway to receive the lowermost of the eggs, said cup member being moveable about its axis to face outwardly for access to the egg therein, and hangers on said ears for supporting said runway and also limiting swinging movement of said cup member in opposite directions.

2. An egg dispenser for use in storing and dispensing eggs within a refrigerator comprising, an inclined runway receiving and feeding eggs downwardly by gravity to a discharge end, upstanding oppositely disposed sides on said runway, ears on said sides at the discharge end of said runway and extending beyond said runway, a cup member between and pivoted to said ears to swing about a horizontal axis and having a position to receive the lowermost egg in said runway, said cup member being movable about its horizontal axis to face outwardly and induce the egg to move forwardly, a lever arm attached to said cup member on the other side of the horizontal axis from the cup to receive the forwardly moving egg and having unbalanced relation with said cup so that the latter returns to egg receiving position, hangers secured to said ears, and stop means on said hangers cooperable with said lever arm and with said cup member to limit pivoting of the cup member in opposite directions.

HERBERT L. DAVIES.

References Cited in the file of this patent

UNITED STATES PATENTS

| Number | Name | Date |
|---|---|---|
| 353,572 | Meyers | Nov. 30, 1886 |
| 1,333,479 | Farmer | Mar. 9, 1920 |
| 1,616,824 | Redlinger | Feb. 8, 1927 |
| 1,619,006 | Vaughan | Mar. 1, 1927 |
| 2,125,000 | Considine | July 26, 1938 |
| 2,149,821 | Sutherland | Mar. 7, 1939 |
| 2,188,044 | Hickman | Jan. 23, 1940 |
| 2,239,369 | Nauert | Apr. 22, 1941 |
| 2,433,472 | McLaughlin | Dec. 30, 1947 |
| 2,513,595 | Stewart | July 4, 1950 |
| 2,588,618 | Di Renzo | Mar. 11, 1952 |

FOREIGN PATENTS

| Number | Country | Date |
|---|---|---|
| 296,849 | Great Britain | Sept. 13, 1928 |